H. S. HELE-SHAW.
HYDRAULIC TRANSMISSION APPARATUS.
APPLICATION FILED MAY 20, 1911.

1,077,980.

Patented Nov. 11, 1913.
8 SHEETS—SHEET 5.

Witnesses:
E. L. Hurley
C. F. Dulin

Inventor;
Henry S. Hele-Shaw
By B. Singer
Atty

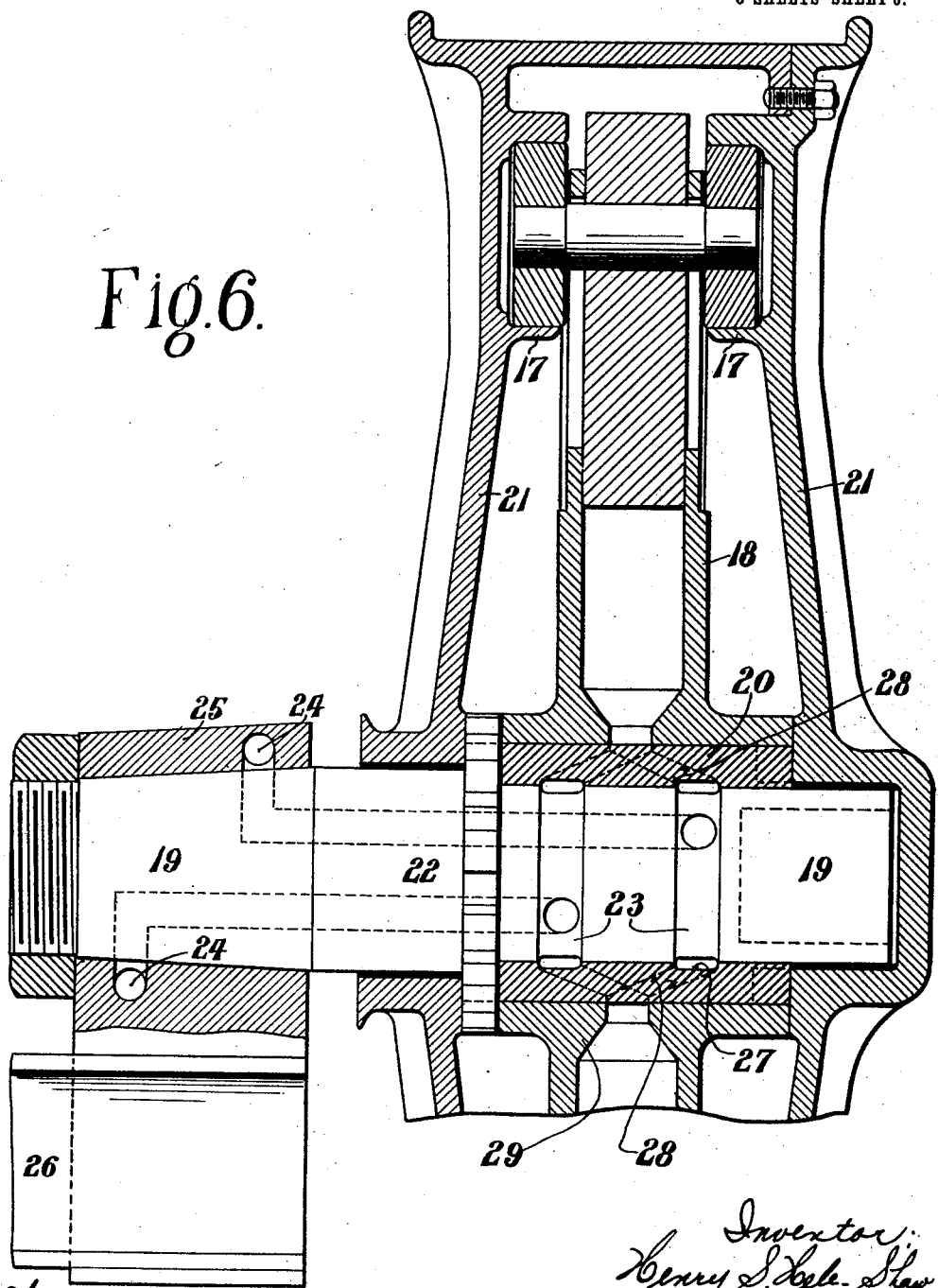

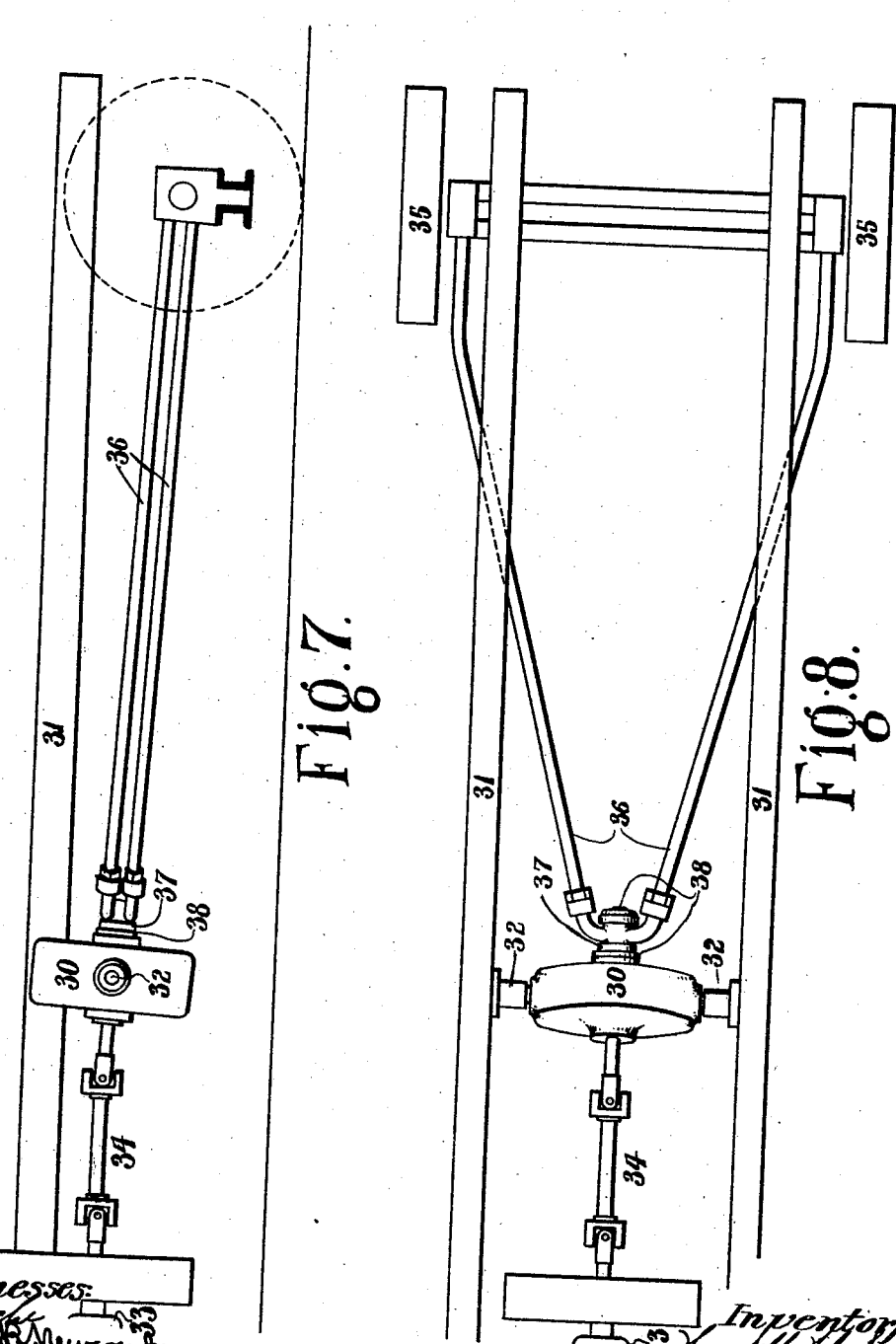

H. S. HELE-SHAW.
HYDRAULIC TRANSMISSION APPARATUS.
APPLICATION FILED MAY 20, 1911.
1,077,980.
Patented Nov. 11, 1913.
8 SHEETS—SHEET 8.
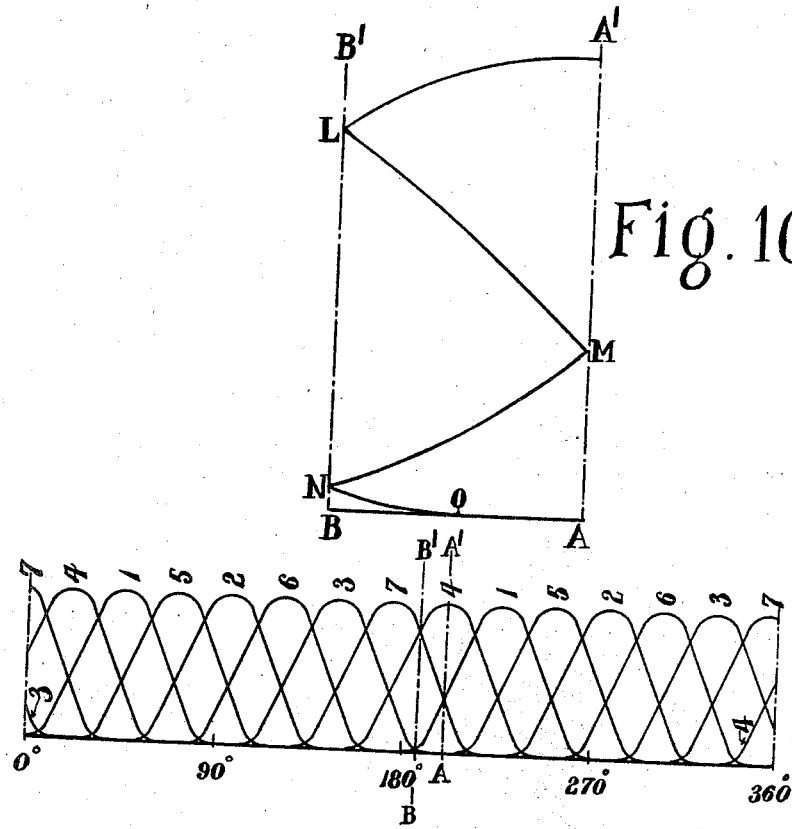
Fig. 10.
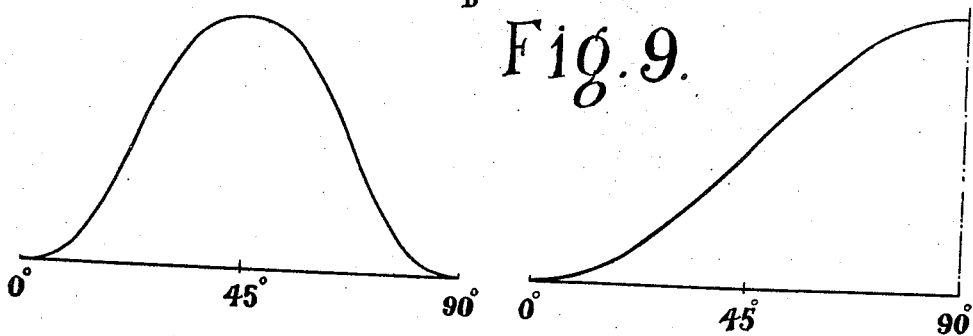
Fig. 9.
Fig. 11.
Fig. 12.
Witnesses:
E. L. Hurley
C. L. Dulin
Inventor:
Henry S. Hele-Shaw
by B. Singer
Atty

UNITED STATES PATENT OFFICE.

HENRY SELBY HELE-SHAW, OF LONDON, ENGLAND.

HYDRAULIC TRANSMISSION APPARATUS.

1,077,980.  Specification of Letters Patent.  Patented Nov. 11, 1913.

Application filed May 20, 1911. Serial No. 628,512.

*To all whom it may concern:*

Be it known that I, HENRY SELBY HELE-SHAW, of London, in the county of London, England, have invented a new and useful Improvement in Hydraulic Transmission Apparatus, of which the following is a specification.

This invention relates to improvements in hydraulic transmission apparatus, and has reference to hydraulic transmission devices wherein a pump is employed to transmit motion through the medium of a liquid to a motor or motors in closed circuit with the pump.

My present invention consists in providing a variable stroke reversible pump or pumps having suitable controlling means adapted to transmit liquid contained in a closed circuit to a motor or motors arranged within and forming the bodies of the wheels of a vehicle. These motors or motor wheels are of the nature of the motor set forth in the specification of British Letters Patent No. 12,574 of 1909, in so far as they comprise a plurality of cylinders rotatable around a fixed valve, said cylinders having pistons fitted with suitable devices which coöperate with fixed cams or eccentrics.

Figure 1:
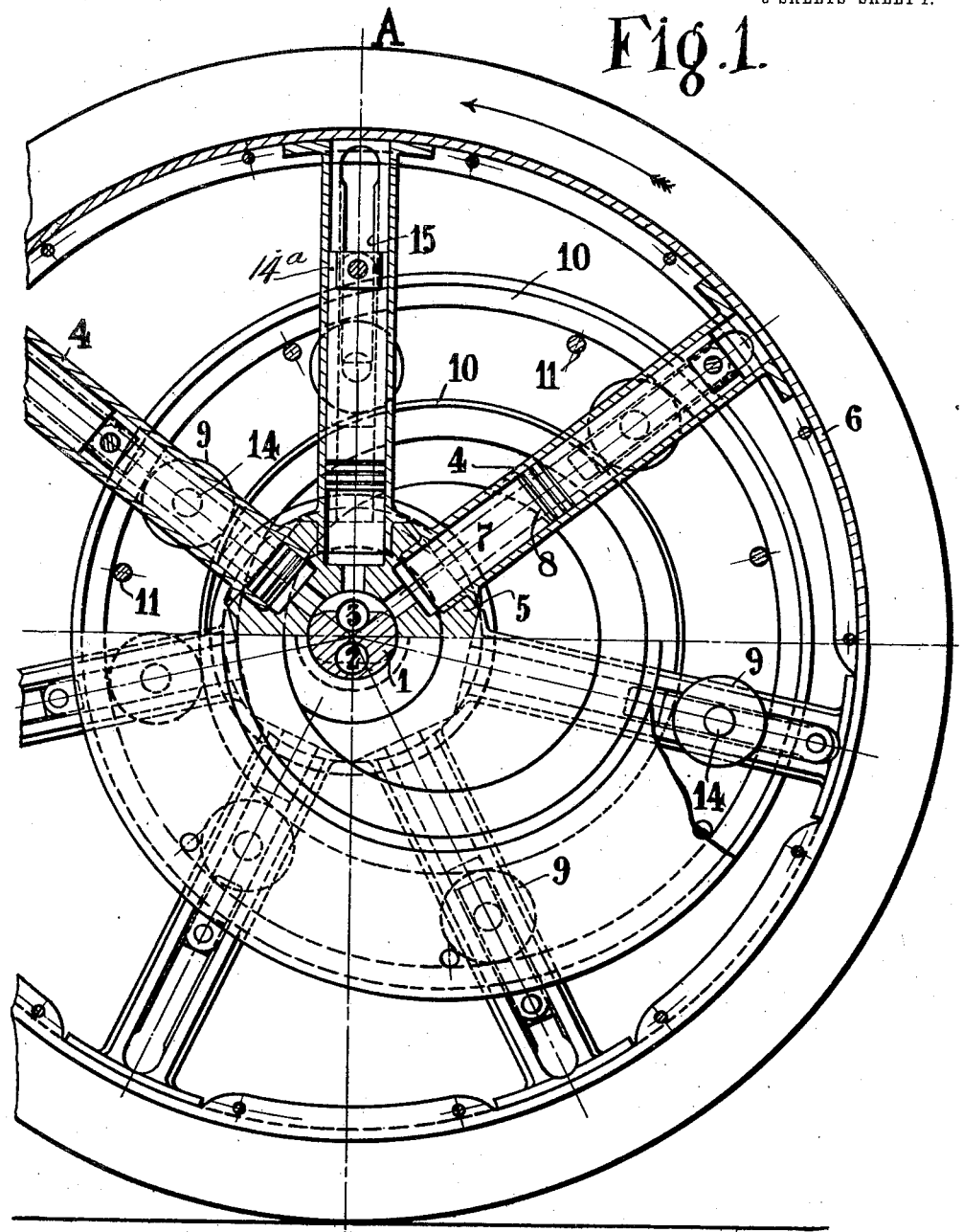
Figure 2:
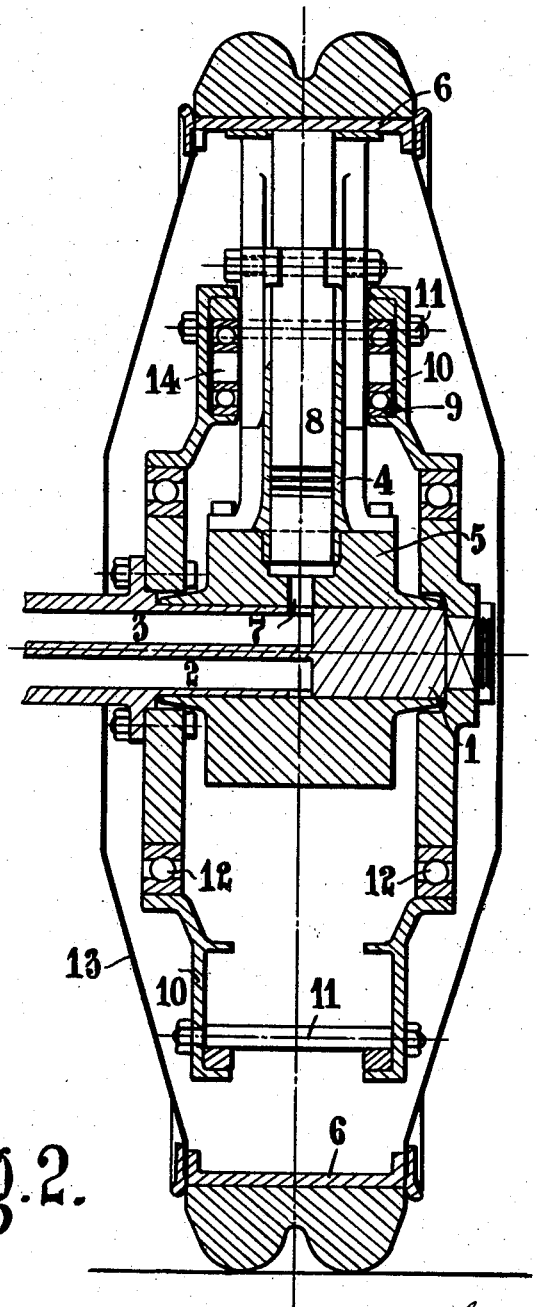
Figure 3:
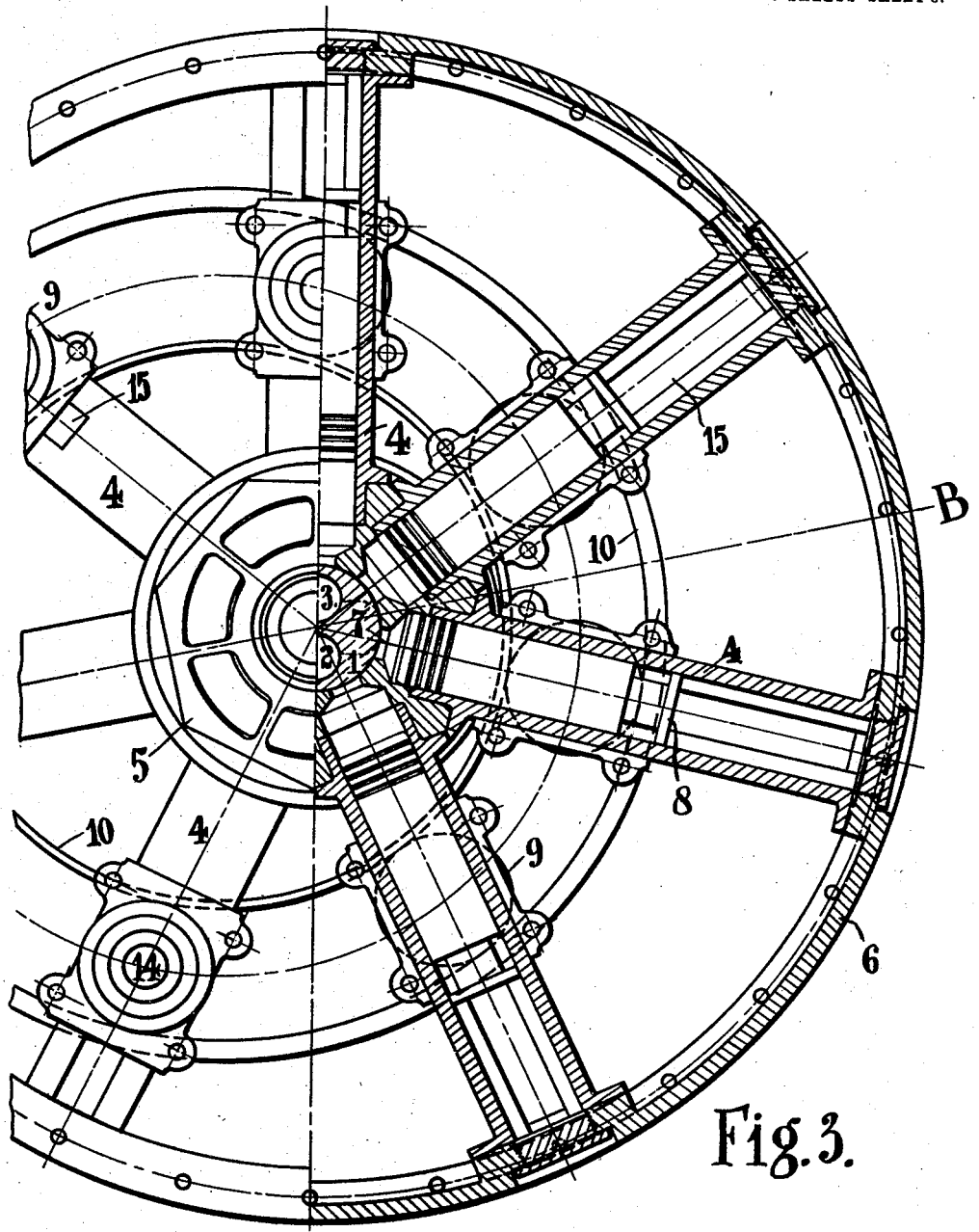
Figure 4:
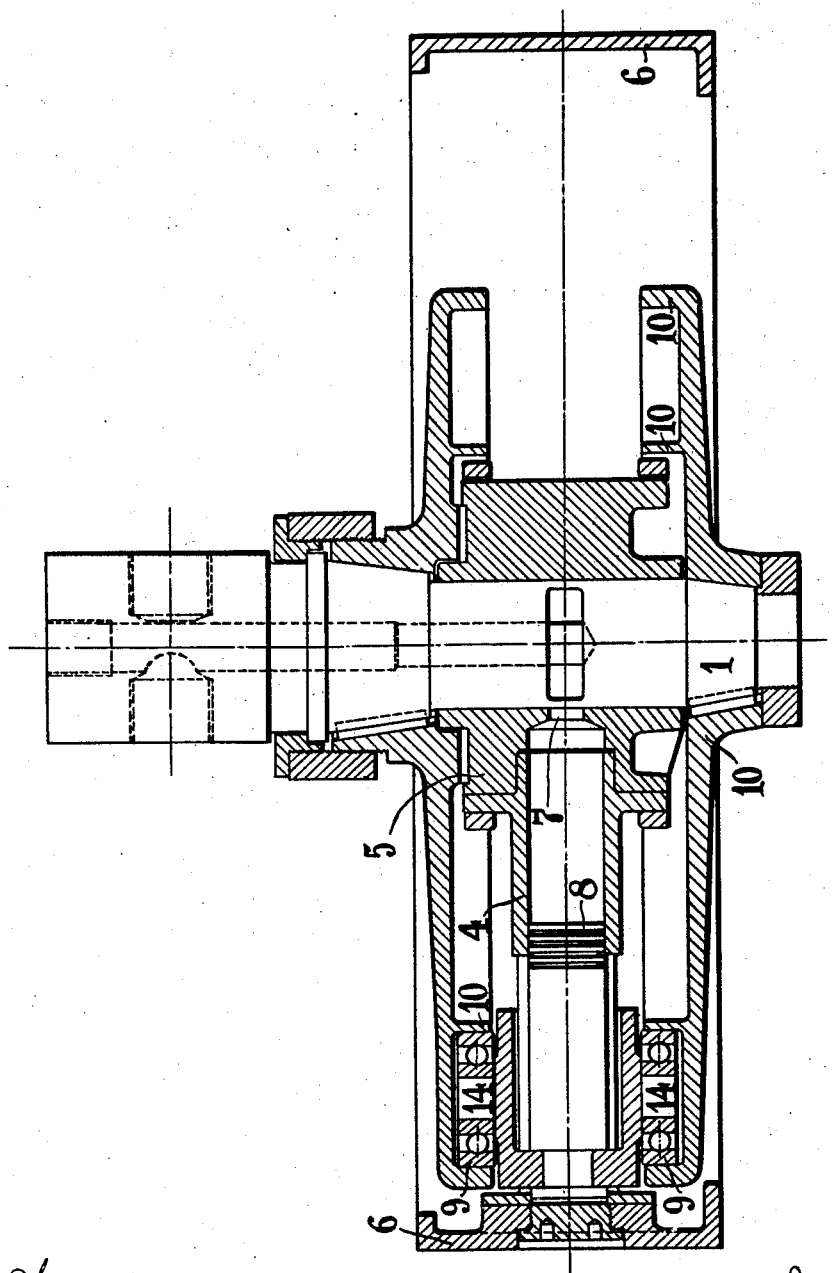
Figure 5:
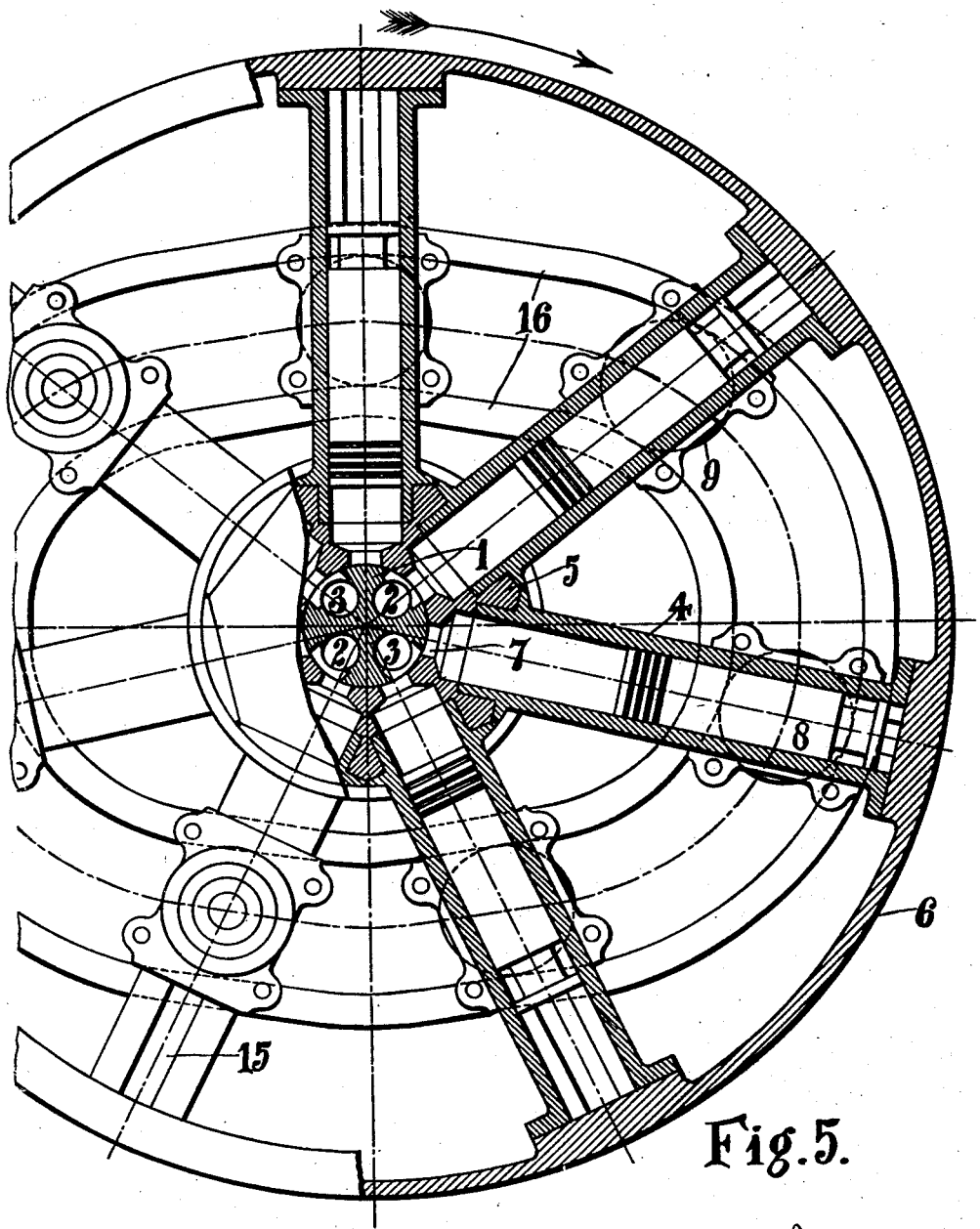

In order that my invention may be readily understood and carried into practice, reference is hereby made to the accompanying sheets of illustrative drawings wherein:

Figure 1 is a side view of a wheel embodying my invention, wherein the upper half is shown in section and the lower half full but with the inclosing casing removed. Fig. 2 is a section on line A—A of Fig. 1. Fig. 3 illustrates a modification of the construction shown in the preceding figures, the distinguishing feature being the substitution of an eccentric stationary path for a floating or rotatable ring mounted upon a fixed eccentric. Fig. 4 is a section on line B—B of Fig. 3. Fig. 5 illustrates a further modification wherein a substantially oval track is substituted for the circular eccentric tracks. Fig. 6 is a sectional view of a construction where the cylinders are stationary relative to the vehicle and the cam paths rotate as parts of the wheel. Figs. 7 and 8 are diagrammatic views illustrating the method of applying the invention to a vehicle. Figs. 9, 10, 11 and 12 are views illustrating the method of graphically finding the forms of a cam path to give constant angular velocity with constant liquid flow for a multi-cylinder pump or motor. Fig. 9 represents the curves of piston velocity for successive pistons. Fig. 10 shows to an enlarged scale a particular section of the curves. Fig. 11 shows the velocity curve for one piston, and Fig. 12 the displacement curve for one piston.

Referring to these drawings, throughout which like numerals of reference indicate corresponding parts, the numeral 1 designates a non-rotatable wheel axle which constitutes the central valve of the motor and has passages 2 and 3 within it to permit of the influx and efflux of liquid to and from the cylinders 4 which cylinders 4 form the spokes of the wheel and are fitted between the central cylinder body boss 5 and the wheel felly 6, passages 7 being formed in the boss 5 to conduct the liquid to and from the valve 1. The cylinders have within them the pistons 8 and these pistons 8 carry on either side the ball rollers 9 or other devices which are hung from the outer ends of the pistons and engage the run in the cam or eccentric tracks 10 on either side. These cams or eccentric tracks 10 are connected together by the bolts 11 which are located and pass between the cylinder spokes of the wheel. The ring thus formed is in the example shown in Figs. 1 and 2 carried upon eccentrically situated ball bearings 12 so that said eccentric ring may be termed a floating ring, a relative movement between this eccentric ring 10 and the wheel as a whole being possible within the limits of the angular distance between the cylinder-spokes. Of course the only relative movement is necessarily small since it is that movement consequent upon the eccentricity of the ring 10 to the central axis of the wheel.

It will of course be understood by those conversant with the art that a variable stroke continuously driven pump preferably of the type described in the specification of British Letters Patent No. 12,574 of 1909 is carried by the vehicle and supplies liquid through a suitable pipe system to wheels constructed in the foregoing manner through the passages 2 and 3 provided as aforesaid in the axles of the vehicle thus forming a hydraulic gear.

Of course the felly of the wheel may carry any form of tire or tread in the ordinary manner and the cylinder-spokes of the wheel as a whole may be inclosed by a suitable casing such as that indicated at 13 and this may be desirable for the purpose of collecting any leakage of the working liquid.

It will also be understood that the usual make up tanks may be employed in the well known manner to compensate for any possible leakage.

It is not necessary that the eccentric ring 10 should be a floating or rotatable ring and in Figs. 3 and 4 I have shown a construction where this ring 10 is keyed upon the vehicle axle which here again forms the central valve. Moreover in the particular construction shown in these figures, the ball rollers or other devices are carried upon pins 14 attached to sliders 14ª carried by the pistons 8, these sliders 14ª being guided in slots 15 in the outer ends of the cylinders and it will be noticed that the arrangement is such that when the pistons are fully out they still prevent access of the working liquid to the slots.

A further modification of my invention is illustrated in Fig. 5 and consists in the substitution of a substantially oval cam ring 16 for the circular eccentric ring 10 and employing in conjunction with the oval ring a duplication of the liquid passages 2 and 3. That is to say, in the running of the wheel under normal conditions there are two inlet or pressure passages and two outlet passages. This construction has the advantage that by cutting out one of the pressure passages from the pump and making it a discharge passage so that there is one pressure passage—three discharge passages—the wheel can be given an additional velocity because all the liquid discharged from the pump can be utilized on only half the number of cylinders per revolution.

Means may be provided for varying within limits the position of the circular eccentric rings, such for instance as a small rod running through the central dead axle or valve and operating, preferably by means of toothed or worm gear, to move the eccentric rings or paths on either side of the wheel synchronously.

The spokes of the wheel constructed in the foregoing manner are preferably inclosed in a casing composed of the wheel rim or felly and the protecting covers or disks 13 and any leakage which may occur will be collected in this casing as has been previously mentioned; and in order that when the covers are removed there is no tendency of oil to fall out, a preferably fixed pipe may be arranged having its lower depending end open in close proximity to the periphery of the wheel, and an auxiliary pump may be arranged to continuously suck up through this pipe any leakage that would otherwise collect. The reaction of the liquid between the valve and the cylinder body is preferably arranged to be at the lower side of the axle so that the vehicle rests on and is supported by a cushion of oil which not only effects lubrication but tends to minimize shock between the metal surfaces. In lieu of or in addition to providing means for varying the eccentricity of the eccentric rings and the stroke of the motor, I may provide means for enabling any of the motor wheels to be cut off from the pump supply so that at high speeds instead of driving on all four wheels, the drive can be effected through two or even one wheel only, the other wheels acting merely as ordinary traveling wheels.

Fig. 6 shows a modification of the form of motor wheel in which instead of the use of fixed cams and revolving cylinders, the cams 17 revolve and the cylinders 18 are fixed by being attached to the fixed axle 19. In this case it is necessary to have a sleeve valve 20, preferably interposed between the axle 19 and the cylinder body 18 and attached to the body of the wheel, so that the valve 20 is carried around and becomes practically part of the revolving wheel. By means of this system the cams themselves form part of the two side covers 21 of the wheel, and in this way great strength can be obtained without increasing the weight of the wheel to any marked extent. In the axle 19 are drilled ports 22 which communicate one with each annular groove 23. These ports also lead to bores 24 in the block 25 carried upon the end of the axle 26. These bores 24 are connected with the circulating pump. The grooves 23 coincide with similar grooves 27 in the valve 20 from which ducts 28, 29, lead to alternate ports of said valve 20.

In Figs. 7 and 8 the mode of applying the invention to a vehicle is shown. The arrangement is as follows: The pump 30 is suspended from the frame 31 of the vehicle by the pivotal connections 32 and the pump is of course driven from the engine 33 by any suitable form of flexible coupling 34. The transmission motors 35 associated with or forming the bodies of the vehicle wheels are connected by a rigid pipe system 36 to a collar or sleeve 37 mounted to swivel upon an extension 38 of the central valve of the pump, the liquid circulating through ports in the valve extension and swiveling connections. By this means while the desired relative movement between the wheels and the vehicle framework consequent upon the vehicle springs is provided for, the strain is taken by the vehicle frame and not by the pipes and moreover the pump can be so mounted as to permit a limited bodily side movement of the transmission motor system.

Referring to the method of obtaining the cam forms illustrated in Figs. 9, 10, 11, and 12 given any number of cylinders $n$ and any number of double—that is in and out—strokes per revolution $m$ it is required to produce a cam such that the machine will rotate with constant angular velocity if supplied with or supplying a constant unvarying flow of liquid. The condition for this is that the sum of the velocities of the outward moving plungers at any instant must be constant. This condition can easily be treated graphically for any particular case.

The following description explains in detail how the cam form is obtained for 7 cylinders and 2 cycles per revolution. The same method could of course be applied to any other combination.

Taking the particular case in which $$n=7 \quad m=2$$

Fig. 9 represents as aforesaid the curves of piston velocity for successive pistons, and the sum of these curves gives the curve for velocity of liquid flow which is required to be a straight line. Now if the two halves of the velocity curve of each cylinder are made identical and the plungers are equally spaced, these curves are made up of a series of reproductions of the portion lying between the lines $AA^1$ and $BB^1$. Fig. 10 shows this portion of the curve on a larger scale. It is obtained in the following manner:—The line AB is made to represent the angle $$\frac{2\pi}{2nm}$$

to any desired scale.

The point $A^1$ is fixed anywhere on the vertical line $AA^1$. The end point O is fixed for the "lap" required on the valve. The points L and N are fixed by trial so as to give as small a maximum acceleration as possible.

The point M is fixed so that $$2MA+AA^1=2NB+2LB.$$

The tangents at $A^1$ and O are horizontal. The pairs of tangents at L, M and N are made so that the tangents in each pair are inclined at equal angles to the horizontal, and their respective slopes are fixed by trial. Finally the curve is plotted in so that at each point the sum of the ordinates is a constant. This curve can be now opened out to give the velocity curve for a single plunger shown in Fig. 11. This curve is integrated by means of a planimeter and the displacement curve shown in Fig. 12 obtained, the scale of which is fixed from the maximum stroke required. The cam form is now determined in the usual way.

What I claim as my invention and desire to secure by Letters Patent is:—

1. Hydraulic transmission apparatus comprising a central spindle, suction and delivery passages in said spindle, a pump supplying liquid to said delivery passage and receiving liquid from said suction passage, a cylinder structure contained within the rim of a motor wheel, pistons reciprocating in the cylinders, cam paths on either side of the cylinders and pistons, devices carried by the pistons coöperating with the cam paths and an outer revolving rim surrounding the cylinders and pistons substantially as specified.

2. Hydraulic transmission apparatus comprising a central spindle having liquid suction and delivery passages, a pump supplying liquid to the delivery passage and receiving liquid from the suction passages, a cylinder structure contained within the rim of a motor wheel, means for distributing the liquid from the pump to and from the cylinders through the delivery and suction passages of the axle, pistons reciprocating in the cylinders, cam paths on either side of the cylinders and pistons rotatable relative to said cylinders and pistons, devices carried by the pistons coöperating in the cam paths and an outer revolving rim surrounding the cylinders and pistons substantially as specified.

3. Hydraulic transmission apparatus comprising a fixed central spindle having passages for the influx and efflux of liquid to and from the cylinders, means for supplying pressure liquid to the influx passage, a fixed cylinder body having radial cylinders, a rotatable sleeve valve interposed between the central spindle and the cylinders, pistons reciprocating in the cylinders, a cam path rotatable in company with the sleeve valve, and devices carried by the pistons coöperating in the cam path substantially as specified.

4. Hydraulic transmission apparatus comprising a fixed central spindle having passages for the influx and efflux of liquid to and from the cylinders, means for supplying pressure liquid to the influx passage, a fixed cylinder body having radial cylinders, a rotatable sleeve valve interposed between the central spindle and the cylinders, pistons reciprocating in the cylinders, cam paths on either side of the cylinders and pistons rotatable in company with the sleeve valve, and devices carried by the pistons coöperating in the cam paths substantially as specified.

5. Hydraulic transmission apparatus comprising a central valve, means for supplying pressure liquid to said valve, cylinders disposed radially relative to the valve, means for distributing liquid to and from said cylinders, pistons reciprocating in said cylinders, cam paths having a curvature constructed to give for any number of cylinders a uniform rate of revolution of the hydraulic motor for a uniform supply and discharge of the working liquid, and devices carried by the pistons coöperating in the cam paths, substantially as specified.

In testimony whereof I affix my signature in presence of two witnesses.

HENRY SELBY HELE-SHAW.

Witnesses:
 EDWARD A. EVE,
 RIPLEY WILSON.